E. MANDEL.
CURD AGITATOR.
APPLICATION FILED JAN. 19, 1909.
932,991.
Patented Aug. 31, 1909.
2 SHEETS—SHEET 1.
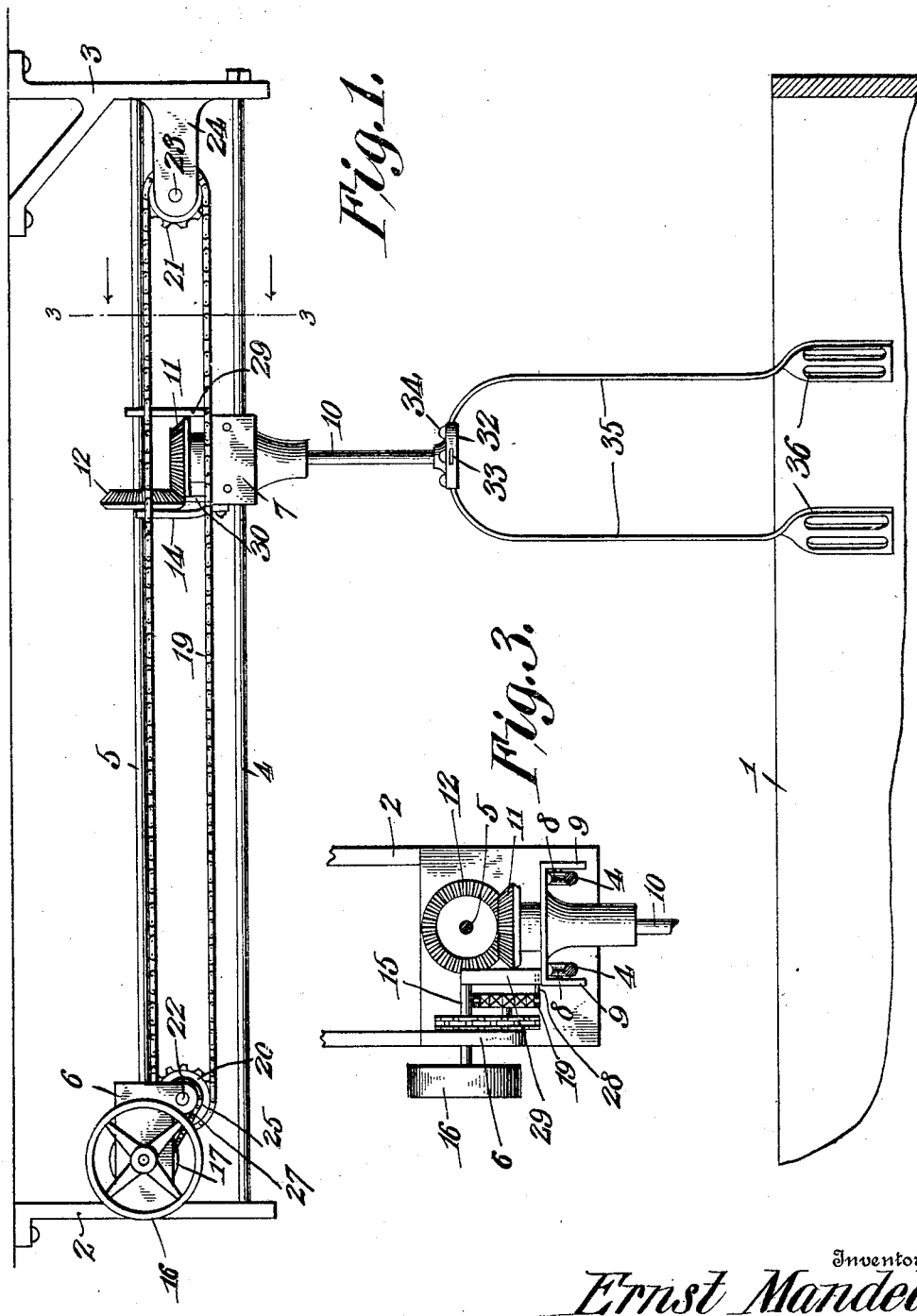
Witnesses
D. D. Galt.
C. C. Hines.
Inventor
Ernst Mandel,
By Victor J. Evans
Attorney E. MANDEL.
CURD AGITATOR.
APPLICATION FILED JAN. 19, 1909.
932,991.
Patented Aug. 31, 1909.
2 SHEETS—SHEET 2.
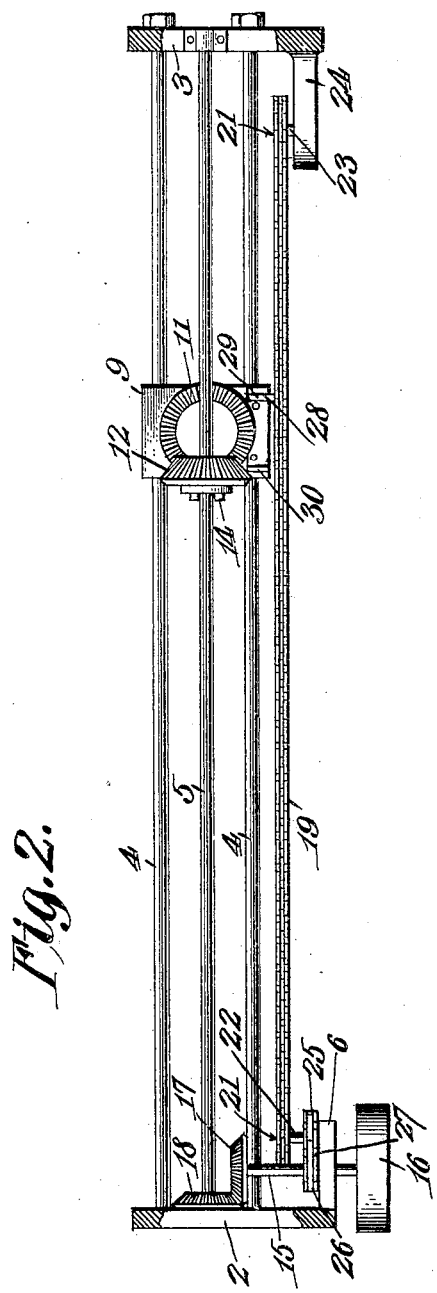
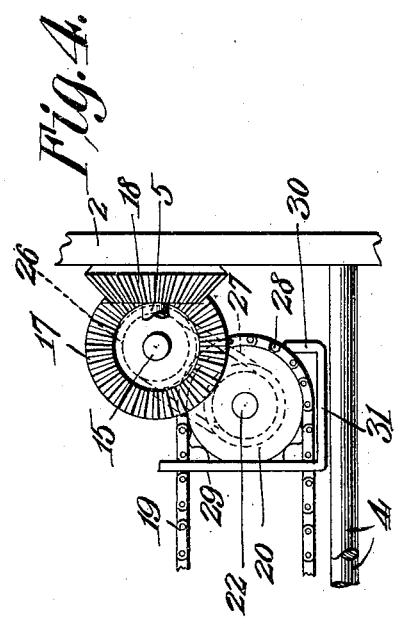
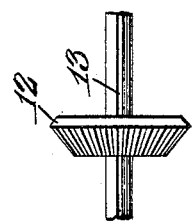
Witnesses
Inventor
Ernst Mandel,
By Victor J. Evans
Attorney

UNITED STATES PATENT OFFICE.

ERNST MANDEL, OF COLBY, WISCONSIN.

CURD-AGITATOR.

932,991.     Specification of Letters Patent.     Patented Aug. 31, 1909.

Application filed January 19, 1909. Serial No. 473,116.

*To all whom it may concern:*

Be it known that I, ERNST MANDEL, a citizen of the United States, residing at Colby, in the county of Clark and State of Wisconsin, have invented new and useful Improvements in Curd-Agitators, of which the following is a specification.

This invention relates to an agitator for agitating the curd in a cheese vat while the curd is cooking, the object of the invention being to provide a simple, effective and inexpensive type of device of this character which will travel back and forth longitudinally of the vat and is provided with paddles or blades to rotate within the vat, so that the curd will be effectively agitated by the double motion of the agitator.

With these and other objects in view, the invention consists of the features of construction, combination and arrangement of parts hereinafter fully described and claimed, reference being had to the accompanying drawings, in which:—

Figure 1 is an elevational view of the agitator and fragmentary sectional view of a cheese tank, illustrating the mode of use of the invention. Fig. 2 is a sectional plan view of the agitator. Fig. 3 is a transverse section on line 3—3 of Fig. 1. Fig. 4 is a detail rear elevation looking toward the drive gearing. Fig. 5 is a detail view of the drive shaft end traveling transmission gear.

Referring to the drawings, 1 designates a cheese vat of the usual oblong rectangular form, and which may be of any suitable construction. Arranged above this vat is an overhead supporting frame structure comprising a pair of brackets 2 and 3, which may be secured to the ceiling of the compartment in which the vat is arranged, and a pair of longitudinal parallel track rails 4 extending between the lower ends of the brackets. The rails are spaced apart a suitable distance, and arranged on a central line above and between same is a longitudinal shaft 5, journaled at one end in the bracket 3 and at its opposite end in an inward extension 6 from the bracket 2.

A carriage 7, of suitable construction, is arranged above the rails and provided with wheels or rollers 8 to travel thereon, and with depending side guide flanges 9 to hold it from displacement. This carriage is provided with a bearing for a vertical shaft 10 which extends above and below the same and carries at its upper end a beveled gear 11 meshing with a similar gear 12 on the shaft 5, by which the motion of the shaft 5 will be transmitted to the shaft 10. The gear 12, which is a transmitting gear, is mounted to rotate with and slide longitudinally on the shaft 5, being provided with a key or feather to engage a longitudinal groove 13 in said shaft, by which the gear is free to travel back and fourth with the carriage 7, so that it will remain in constant mesh with the gear 11. The gear 12 is held from sliding movement independent of the carriage in one direction by the gear 11 and from reverse sliding movement independent of the carriage by an arm 14 fixed to the carriage and having a forked or bifurcated upper end straddling the shaft 5 and bearing on the face of the gear 12, so that when the carriage is moved in one direction or the other the transmitting gear, while revolving with the shaft 5, will also travel with the carriage. Mounted upon the extension 6 of the bracket 2 is a transversely arranged drive shaft 15 on the outer end of which is a pulley 16, by which said shaft may be driven from any suitable source of power. Motion is transmitted from the shaft 15 to the shaft 5 through beveled gears 17 and 18 on the adjacent ends of said shafts, as shown in Figs. 2 and 4. Arranged at the front of the frame to travel horizontally on a plane between the plane of the rails 4 and shaft 5 is an endless operating belt or band 19, shown in the present instance in the form of a sprocket chain, which passes around sprocket wheels 20 and 21 mounted, respectively on shafts 22 and 23 journaled respectively on the extension 6 of the bracket 2 and an inward extension 24 from the bracket 3. The shaft 22 also carries a sprocket wheel 25 which is connected with a sprocket wheel 26 on the drive shaft 15 by the usual sprocket chain 27, whereby in the operation of the drive shaft, as it rotates to the right in Fig. 1, the chain will be driven, its upper stretch moving in the direction of the arrows in said figure or from left to right between brackets 2 and 3.

For the purpose of operating the carriage over the endless chain belt, the belt is provided with an inwardly or laterally projecting pin or engaging member 28, which is adapted to engage a pair of fingers or projections 29 and 30 extending vertically from the carriage in parallel relation and formed by the arms of a bracket 31, the arm 29 being relatively longer and extending upward a greater height than the arm 30. These parts are adapted to operate to cause the carriage to travel in reverse directions and to reverse the direction of movement thereof at its limits of movement in the manner hereinafter described. The shaft 10 carries at its lower end a disk or head 32 provided with a series of equidistantly arranged radial slots 33 within which are detachably secured, as by screws or other suitable fastenings 34, the upper ends of one or more depending dasher arms 35 each carrying at its lower end a perforated dasher blade or paddle 36. In the present instance, I have shown the application of two dasher members to the shaft head 32, although four may be applied thereto in the illustrated construction, it being understood, however, that the head may be adapted for supporting any suitable number of dasher members, the construction allowing one or more within the defined limits to be applied as circumstances may require in the operation of agitating the curd.

In the operation of the device, assuming the carriage to be traveling from left to right, the pin 28 will be upon the upper stretch of the chain 19 and in engagement with the arm 29, and will, therefore, couple the chain to the carriage to move the carriage longitudinally along the frame, thus correspondingly transporting the blades of the agitator within the tank. When the carriage reaches the limit of its movement to the right, the finger or arm 29 is pushed by the pin 28, in the course of travel of the latter around the sprocket wheel 21, beyond said sprocket wheel, thus allowing the pin to pass without interference, so that it becomes a part of the lower stretch of the chain moving from right to left. The pin will, therefore, come in contact with the pin or arm 30 and therefore, transmit a reverse motion to the carriage, which will accordingly travel the full distance from the sprocket wheel 21 to the sprocket wheel 20. At this point the pin, in passing upward around the sprocket 20, will push the finger 30 past said sprocket and become a part of the upper stretch of the chain again, and will accordingly again engage the arm or finger 29 and thereby carry the carriage again to the right. In this manner, through the continuous operation of the chain, the carriage will be automatically operated back and forth above the tank a distance corresponding to the length of the tank, so that the blades of the dasher or agitator will travel through the curd along the full length of the tank.

As before described, the shaft 5 is in constant motion and the gear 12 travels back and forth thereon with the carriage 7 and is constantly driven so that it will continuously rotate the shaft 10, whereby the agitator, in addition to traveling longitudinally along the tank, is rotated so that the blades 36 will agitate the curd. By this means a thorough agitation of the curd while it is being cooked within the tank may be effected, with better advantage in the quality of the resultant product over processes employing the ordinary agitating methods. The apparatus may be employed in connection with any ordinary vat or tank in common use, is simple of construction, and may be manufactured and installed at a comparatively low cost.

Having thus fully described the invention, what is claimed as new, is:—

1. A curd agitator comprising a supporting frame, a carriage arranged to travel back and forth longitudinally thereon, an agitator suspended from the carriage, an endless belt mounted on the frame with its stretches in superposed relation, means for transmitting motion thereto, coöperating engaging devices on the belt and carriage for alternately connecting the carriage with the upper and lower stretches of the belt, and means for simultaneously rotating the agitator.

2. A curd agitator comprising an overhead supporting frame, a carriage mounted to travel longitudinally back and forth upon the frame, a rotating agitator suspended from the carriage, an endless belt mounted on the frame, means for transmitting motion thereto, coöperating engaging devices on the belt and carriage for effecting the movements of the latter, a shaft operating in unison with the belt, a gear mounted to rotate with and slide along said shaft, said gear being arranged to travel with the carriage, and a gear on the agitator meshing with said traveling gear.

3. A curd agitator comprising an overhead supporting frame, a carriage arranged to travel longitudinally thereon, an endless belt mounted on the frame and having a projection, means for operating the belt, fingers or projections on the carriage for coöperation with the projection on the belt to adapt the latter to move the carriage in reverse directions, an agitating device suspended from the carriage, and means for rotating the agitating device in the back and forth movements of the carriage.

4. A curd agitator comprising an overhead supporting frame, a carriage mounted to travel longitudinally back and forth upon the frame, an endless belt mounted on the frame, coöperating engaging members on the carriage and belt for moving the carriage in reverse directions in the operation of the belt, a rotary agitator suspended from the carriage, a shaft journaled on the frame and operating with the belt, and gearing for rotating the agitator in its back and forth movements, including intermeshing gears, one of said gears being mounted to travel with the carriage and to rotate with and slide along said shaft.

5. A curd agitator comprising an overhead supporting frame, a carriage mounted to travel longitudinally back and forth on the frame, a longitudinal shaft journaled on the frame for continuous motion in one direction, a gear arranged for movement with the carriage and feathered to slide on and rotate with the shaft, relatively long and short contact fingers on the carriage, an endless belt supported longitudinally on the frame to provide upper and lower longitudinal stretches, a contact device on the belt coacting with said fingers to alternately connect the carriage with the upper and lower stretches of the belt at the limits of movement of the carriage to cause the same to travel back and forth along the frame, and gearing for driving the shaft and belt, each continuously in one direction.

In testimony whereof I affix my signature in presence of two witnesses.

ERNST MANDEL.

Witnesses:
  E. D. Loos,
  R. G. Salter.